US012488951B2

(12) United States Patent
Sayinc et al.

(10) Patent No.: US 12,488,951 B2
(45) Date of Patent: Dec. 2, 2025

(54) SENSING DEVICE

(71) Applicant: Weinert Industries AG, Föritztal (DE)

(72) Inventors: Hakan Sayinc, Berlin (DE); Oliver Gross, Berlin (DE); Juntao Deng, Jiangsu (CN); Wei Lu, Jiangsu (CN)

(73) Assignee: WEINERT INDUSTRIES AG, Föritztal (DE)

( * ) Notice: Subject to any disclaimer, the term of this patent is extended or adjusted under 35 U.S.C. 154(b) by 142 days.

(21) Appl. No.: 18/035,487

(22) PCT Filed: Nov. 5, 2020

(86) PCT No.: PCT/CN2020/126793
§ 371 (c)(1),
(2) Date: May 4, 2023

(87) PCT Pub. No.: WO2022/094874
PCT Pub. Date: May 12, 2022

(65) Prior Publication Data
US 2024/0019280 A1 Jan. 18, 2024

(51) Int. Cl.
H01H 9/16 (2006.01)
G01D 5/353 (2006.01)
(Continued)

(52) U.S. Cl.
CPC ............ *H01H 9/168* (2013.01); *G01D 5/353* (2013.01); *G01D 5/35367* (2013.01);
(Continued)

(58) Field of Classification Search
CPC .. H01H 9/16; H01H 9/161; H01H 9/167–168; G02B 6/3502; G02B 6/3566; G01D 5/353
See application file for complete search history.

(56) References Cited

U.S. PATENT DOCUMENTS 4,692,612 A 9/1987 Havel
4,729,630 A * 3/1988 Martinez ............ G01D 5/35345
250/231.19
(Continued)

FOREIGN PATENT DOCUMENTS

CN 102499688 A 6/2012
CN 102890236 A 1/2013
(Continued)

OTHER PUBLICATIONS

Extended European search report in application 20960335.6, dated Jun. 20, 2024. (Year: 2024).*
(Continued)

Primary Examiner — Michael Stahl
(74) Attorney, Agent, or Firm — LEYDIG, VOIT & MAYER, LTD.

(57) ABSTRACT

A sensing device (10) for a high voltage disconnecting switch (20). The sensing device (10) comprises: a first optical fiber (110) configured to receive light from an optical source (100) and configured to guide the light; an optical collimator (120) coupled to the first optical fiber (110) to receive the light guided in the first optical fiber (110) and configured to collimate the light into a collimated light beam; a bendable optical component (130) coupled to the optical collimator (120) to receive the collimated light beam and configured to guide the collimated light beam, wherein the bendable optical component (130) is configured and arranged to bend depending on a switching state of the high voltage disconnecting switch (20), thereby influencing the collimated light beam; and a deriving unit (160) configured to derive information about the switching state of the high voltage disconnecting switch (20) based on the collimated light beam.

13 Claims, 16 Drawing Sheets

Figure 1:
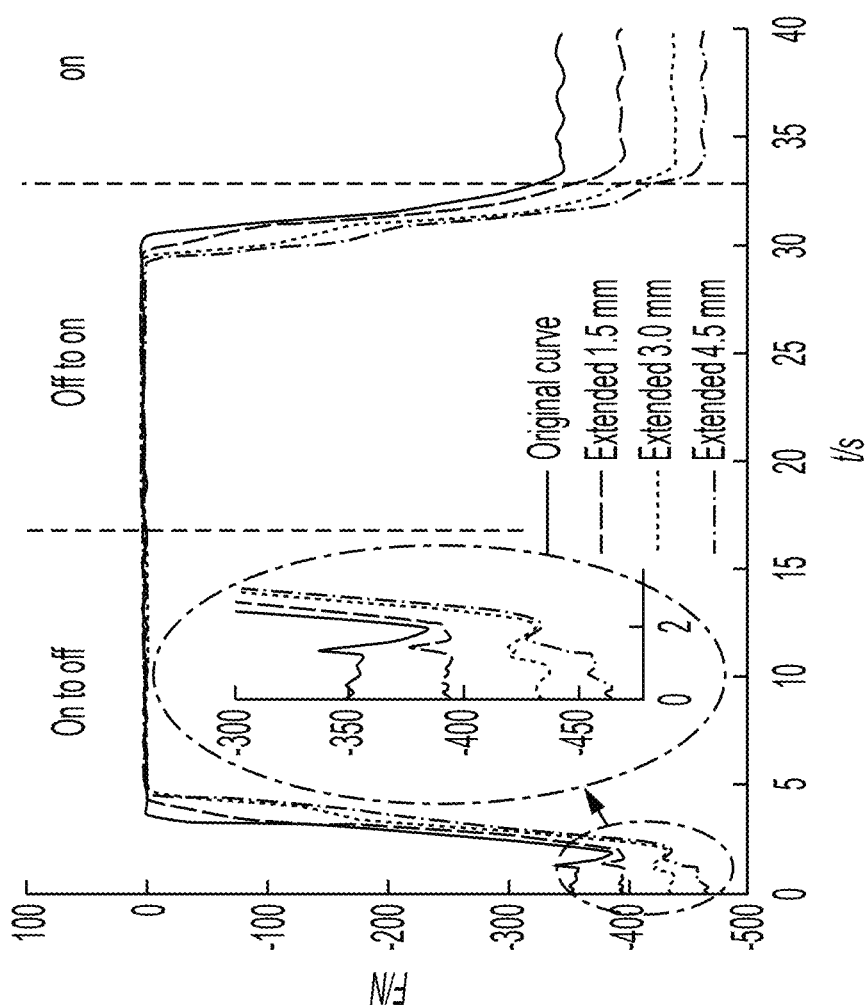

(51) Int. Cl.
*G01R 31/327* (2006.01)
*G02B 6/35* (2006.01)
*H03K 17/968* (2006.01)

(52) U.S. Cl.
CPC ....... *G01R 31/3275* (2013.01); *H03K 17/968* (2013.01); *G02B 6/3502* (2013.01); *G02B 6/3566* (2013.01)

(56) References Cited

U.S. PATENT DOCUMENTS

| | | | |
|---|---|---|---|
| 5,093,569 A * | 3/1992 | Krumboltz | G02B 6/264 250/231.19 |
| 5,633,494 A | 5/1997 | Danisch | |
| 9,544,049 B2 * | 1/2017 | Fink | H04Q 11/0067 |
| 2002/0097960 A1 * | 7/2002 | Greenaway | G01D 5/3538 385/36 |
| 2007/0001677 A1 * | 1/2007 | Adam | H01H 1/0015 324/421 |
| 2009/0040046 A1 * | 2/2009 | Browning, Jr. | G08B 13/08 340/552 |
| 2014/0210770 A1 * | 7/2014 | Chen | G06F 3/044 345/174 |
| 2015/0003774 A1 * | 1/2015 | Courchaine | G02B 6/3897 385/12 |
| 2018/0052192 A1 | 2/2018 | Pradhan et al. | |
| 2018/0254159 A1 | 9/2018 | Shi et al. | |
| 2022/0359139 A1 * | 11/2022 | Hu | H01H 33/596 |

FOREIGN PATENT DOCUMENTS

| | | |
|---|---|---|
| CN | 203519036 U | 4/2014 |
| CN | 110101390 A | 8/2019 |
| CN | 111238407 A | 6/2020 |
| DE | DD 269040 A1 * | 6/1989 |
| JP | 6-44094 U * | 6/1994 |

OTHER PUBLICATIONS

International Search Report and Written Opinion mailed on Aug. 4, 2021 in the corresponding International Application No. PCT/CN2020/126793.

Wang Qi et al, Review of optical fiber bending/curvature sensor, Measurement, ScienceDirect, Jul. 25, 2018, pp. 161-176, vol. 130, XP085499222, ISSN: 0263-2241, DOI: 10.1016/J.MEASUREMENT. 2018.07.068, Elsevier, Netherlands.

* cited by examiner

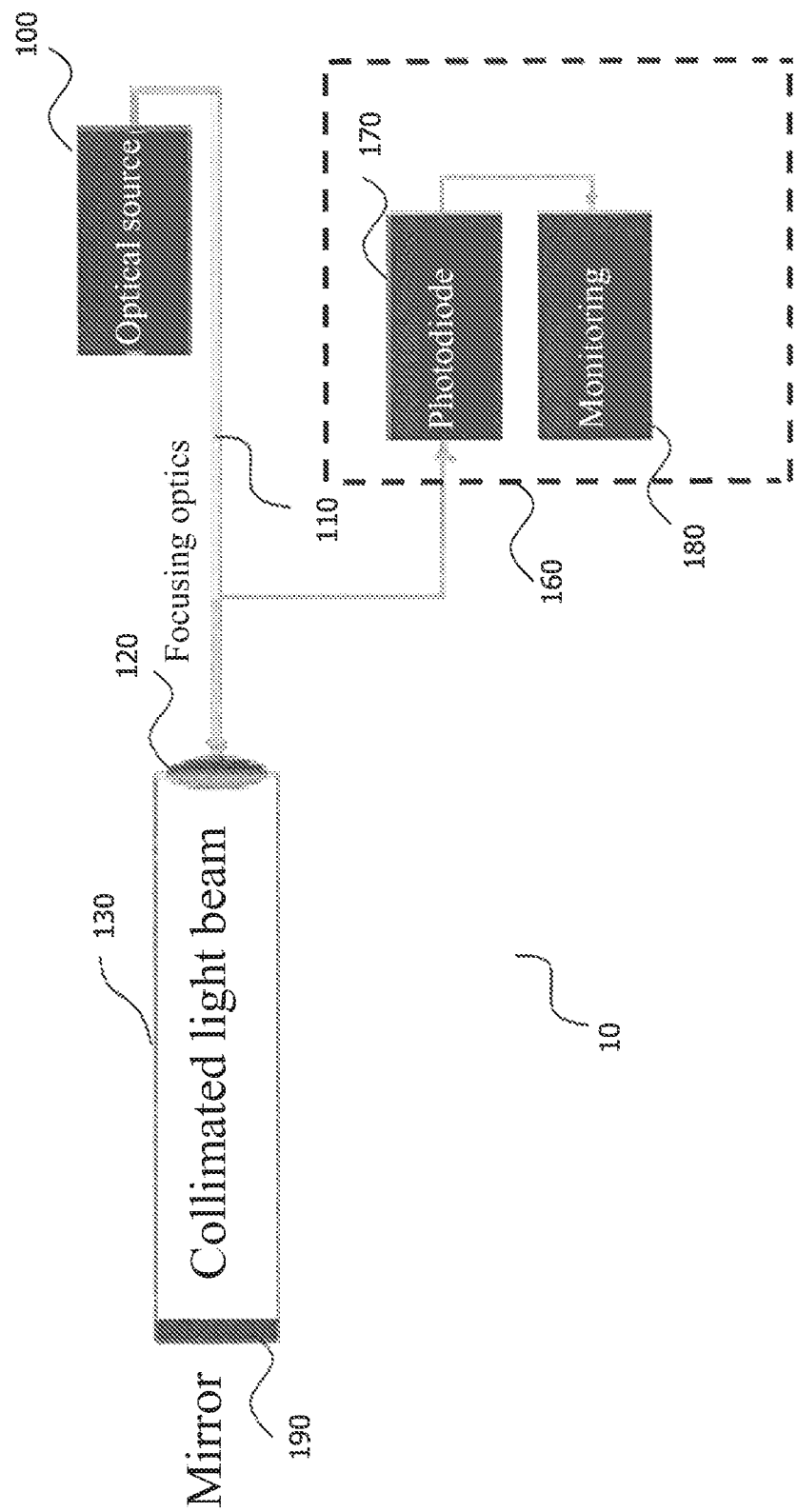

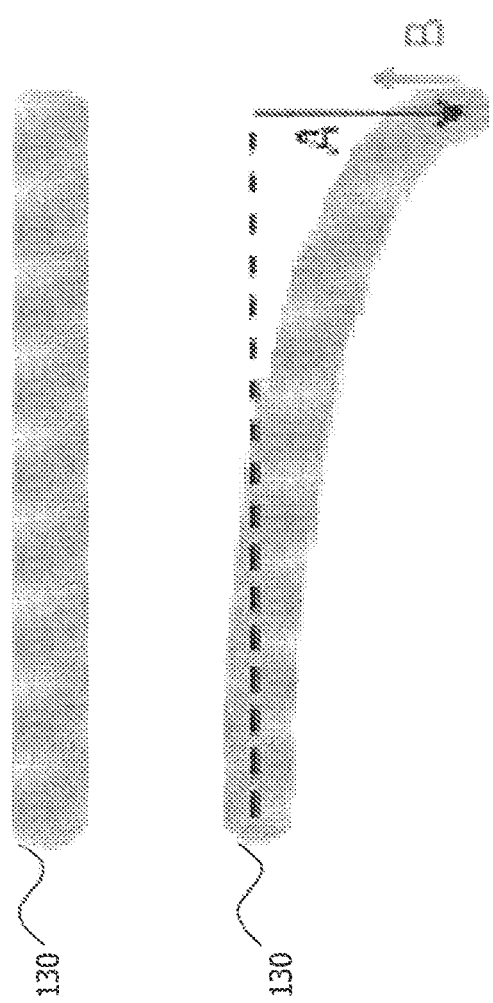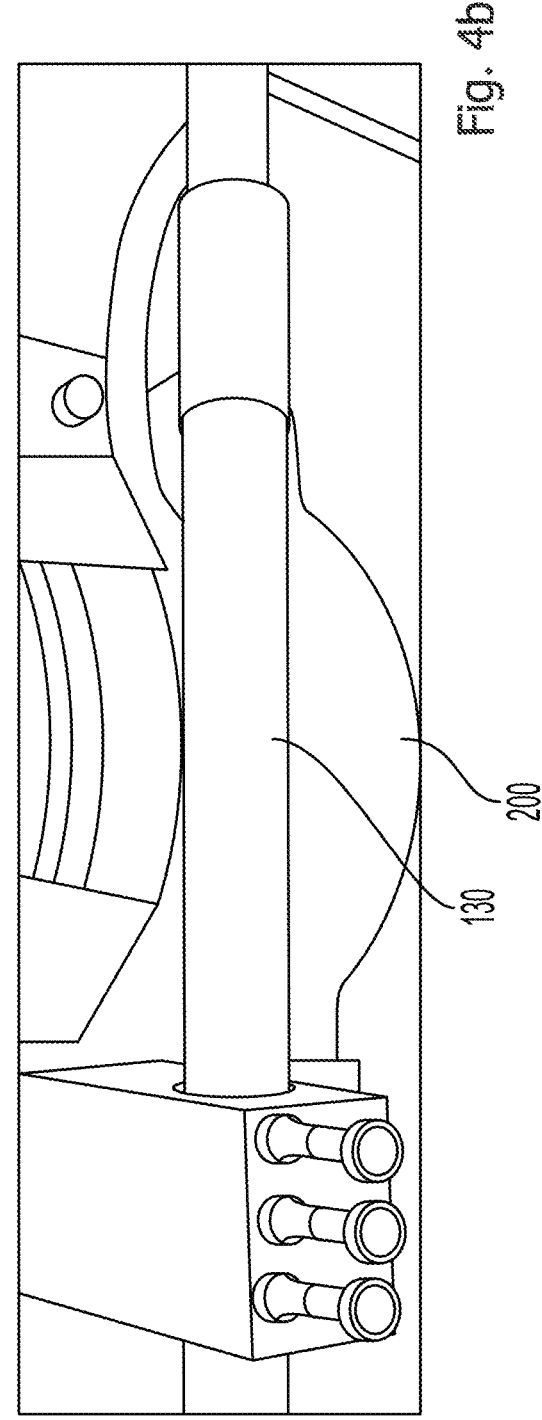

SENSING DEVICE

CROSS-REFERENCE TO RELATED APPLICATION(S)

This application is the National Stage entry under 35 U.S.C. § 371 of International Application No. PCT/CN2020/126793, filed on Nov. 5, 2020, published on May 12, 2022 under Publication Number WO 2022/094874 A1, the entirety of which is herein incorporated by reference.

The present invention generally relates to field of sensing devices. More specifically, the present invention relates to a sensing device for a high voltage disconnecting switch and a high voltage disconnecting switch having such a sensing device.

Disconnecting switches are generally known in the art. Such disconnecting switches can enter two dedicated states, i.e. an on state (ON) and an off state (OFF). For several applications the detection of the respective state of the disconnecting switch (also sometimes just called disconnector) is needed.

Smart substation devices are paving the way for improving the operation safety and the reduction of downtimes. The digitization of the asset status with smart sensors allows a fast error localization and predictive maintenance. Breaking-closing disconnecting switches (BCDS) are a special type of disconnecting switch and are among the most important components in todays substations. These components have moving parts. Therefore, operating a BCDS naturally can have the following failure modes:
- switch is mechanically blocked at a position which is neither "open" nor "closed"
- a relative position of male and female contact which is not completely "closed" (low finger pressure) and which can lead to heat up of the contacts leading to a lower carried current.

There is an increasing desire for online monitoring of disconnecting switches such as BCDS.

IEC 62271-102 n.d. states the general mandatory type tests for disconnecting switches. According to the IEC, it is expected that a device is indicating the position of the disconnecting switch correctly. Such a device is not specified in detail. Is has been stated before that BCDS are causing a major part of significant events for the safety of an electrical system in substations. The main problem occurring is a loss of the "open or closed" information. Such events are restricting topology changes, weaken the substation system and require on-site intervention. These facts are motivating the development of smart sensors for monitoring the device status. By employing such sensors, data logging and processing enables to gain insights on the BCDS health state and if necessary, to start preventive actions.

Currently, several techniques are considered for online monitoring of BCDS. Different methods are currently under investigation to enable a monitoring of the switch status. For example, a real-time monitoring of the operating torque of the disconnector is proposed in S. Douillard et al. "Disconnectors reliability on the French grid and means to reduce the consequences of their failures on the electrical system", Cigré 2018. With the method described therein, the switch movement can be compared with minimum and maximum values. It was reported that the operating torque values are highly dependent on the temperature of the environment. This needs to be corrected by an algorithm.

A review of further monitoring techniques is given in Bozhong et al. "Review on Breaking-closing Position Monitoring Method for Intelligent Disconnecting Switches", IOP Conf. Ser.: Earth Environ. Sci. 223, 2018. A method under research is image recognition. In this method, the purpose is to extract features from image regions to conclude the status of the BCDS. This can be done by fixed or traveling cameras for observing the switch. Besides advantages like high degree of automation and scaling, this method also has disadvantages like the sensitivity to weather conditions and high cost. Further, using a camera for imaging makes the method sensitive to the magnetic fields in the environment of the BCDS.

Optics based approaches have been proposed. For example, a laser source and a reflection mirror are used to prove if the switch contact is in the right position. In another approach, three subsystems are integrated to a single monitoring unit. The relative positon sensing is conducted by employing a single LED and 32 phototransistors. Mems were employed to enable vibration measurements during operation. As current source, a solar panel was used. The operation duration of the monitoring unit was dependent on the data communication frequency. It is not expected that the presented optic based methods offer neither a good enough spatial nor a good enough temporal resolution measurement to enable predictive maintenance. Furthermore, all of the employed subsystems necessarily need a current flow. In the direct vicinity of high magnetic fields it is unclear how the accurate calibration and stable operation of the electrically driven subsystems can be secured.

Fiber based displacement measurements have been considered. Power coupling losses between optical fibers of identical and differing Numerical Aperture (NA) were investigated earlier. For example, the coupling efficiency between two fibers, which have an angle misalignment, has been calculated. Further, the misalignment loss due to transversal misalignment together with an angular misalignment has been proposed. In both cases, only two fiber ends without any other optical components were taken into account.

Fiber based bending sensors have been considered in the context of fiber based bending sensors that are realized with Fiber Bragg Gratings (FBG). Such components have a local refractive index structure at the point of interest (length approximately which is reflecting/transmitting an incoming signal at a certain wavelength by a predetermined percentage like a mirror. If an FBG experiences environmental effects like tensile stress, temperature-change, humidity, the reflected/transmitted amount of light changes remarkably. Such sensors and read-out units are commercially available on the market.

In summary, the current state of the art cannot fulfill the demand for measurements of critical physical quantities under the extreme environmental conditions in which the BCDS are operated.

Therefore, there is a demand for improved sensing devices for high voltage disconnecting switches. For example, there may be a demand for sensing devices for high voltage disconnecting switches providing accurate results and/or enabling reliable monitoring of high voltage disconnecting switches.

According to a first aspect of the present invention a sensing device for a high voltage disconnecting switch is proposed. The sensing device comprises a first optical fiber, an optical collimator, a bendable optical component and a deriving unit. The first optical fiber is configured to receive light from an optical source and configured to guide the light. The optical collimator is coupled to the first optical fiber to receive the light guided in the first optical fiber. The optical collimator is configured to collimate the light into a collimated light beam. The bendable optical component is coupled to the optical collimator to receive the collimated light beam. The bendable optical component is configured to guide the collimated light beam. The bendable optical component is configured and arranged to bend depending on a switching state of the high voltage disconnecting switch, thereby influencing the collimated light beam. In other words, the collimated light beam can be influenced by bending the bendable optical component. The deriving unit is configured to derive information about the switching state of the high voltage disconnecting switch based on the collimated light beam.

The high voltage disconnecting switch may be any switching device that can be used in a high voltage environment for connecting devices (in an on state of the high voltage disconnecting switch) and for disconnecting devices (in an off state of the high voltage disconnecting switch). One or more different mechanisms or components may be installed or arranged on the high voltage disconnecting switch in order to bring the high voltage disconnecting switch from an on state into an off state and vice versa, e.g. a switch arm. The optical source may be any light source such as a laser light source. The light may be laser light. The optical source may be directly or indirectly coupled or connected to the optical collimator and/or to the bendable optical component. The optical collimator may be a collimating lens and/or a converging lens. For example, the optical collimator may be or comprise a first collimating lens.

The bendable optical component is configured and arranged to bend depending on a switching state of the high voltage disconnecting switch. The optical properties of the bendable optical component may be changed based on the bending or bending degree or bending state of the optical component. The collimated light beam may propagate differently based on the bending or bending degree or bending state of the bendable optical component. The bending of the bendable optical component may change optical properties of the bendable optical component and thus optical properties of the collimated light beam. Depending on the degree of bending (bending degree) of the bendable optical component, the optical properties of the collimated light beam might change. For example, with increasing bending degree of the bendable optical component, an optical loss in the collimated light beam might increase.

As the bending or bending degree or bending state of the bendable optical component may be dependent on the switching state of the high voltage disconnecting switch, the deriving unit may be configured to derive the switching state of the high voltage disconnecting switch from the bending or bending degree or bending state of the bendable optical component. For example, the high voltage disconnecting switch or one or more components of the high voltage disconnecting switch, e.g. a switch spring or switch arm of the high voltage disconnecting switch, may be directly or indirectly coupled or connected to the sensing device, e.g. the bendable optical component of the sensing device. The switch arm may be understood as a movable element. The switch arm may bring the switch, i.e. the high voltage disconnecting switch, from an off into an on state and vice versa. The switch arm is sometimes considered a male contact. The switch arm may comprise a metal contact. The switch spring (e.g. a left spring and right spring) may be a static element that cannot move or cannot be moved. The switch spring is sometimes considered a female contact or part of the female contact. In other words, the switch arm may be a movable element which brings the switch from an off into an on state and vice versa. On the end of each switch arm, there may be a contact element such as a copper contact. The switch spring may be an element which may be added on the female copper contact to ensure a tight connection or to make sure the connection is tight. The deriving unit may be directly or indirectly coupled or connected to the focusing optics and/or the bendable optical component.

According to a first possible embodiment of the sensing device, the optical collimator may be directly or indirectly coupled to a first end of the bendable optical component, e.g. an input end of the bendable optical component. The sensing device may further comprise a focusing optics and a second optical fiber. The focusing optics may be directly or indirectly coupled to a second end, e.g. an output end, of the bendable optical component to receive the collimated light beam guided in the bendable optical component. The focusing optics may be directly or indirectly coupled to the second optical fiber. The focusing optics may be configured to focus the collimated light beam into the second optical fiber. The second optical fiber may be configured to guide the focused light. The deriving unit may be directly or indirectly coupled to the second optical fiber to receive the focused light guided in the second optical fiber. The deriving unit may be configured to derive the information about the switching state of the high voltage disconnecting switch based on the received focused light. For example, the deriving unit may be configured to derive the information about the switching state of the high voltage disconnecting switch only from the received focused light. The focusing optics may be a collimating lens and/or a converging lens. For example, the focusing optics may be or comprise a second collimating lens distinct from the optical collimator, e.g. the first collimating lens.

According to a second possible embodiment of the sensing device, the optical collimator may be directly or indirectly coupled to a first end of the bendable optical component. The sensing device may further comprise a mirroring component and a focusing optics. The mirroring component may be coupled to a second end of the bendable optical component to reflect the collimated light beam back to the first end of the bendable optical component. The focusing optics may be coupled to the first end of the bendable optical component to receive the reflected collimated light guided in the bendable optical component. The focusing optics may be directly or indirectly coupled to the first optical fiber. The focusing optics may be configured to focus the reflected collimated light beam into the first optical fiber. The first optical fiber may be configured to guide the focused light. The deriving unit may be directly or indirectly coupled to the first optical fiber to receive the focused light. The deriving unit may be configured to derive the information about the switching state of the high voltage disconnecting switch based on the received focused light. The deriving unit may be configured to derive the information about the switching state of the high voltage disconnecting switch only from the received focused light. The focusing optics may be a collimating lens and/or a converging lens. For example, the focusing optics may be or comprise the optical collimator, e.g. the first collimating lens.

The optical collimator, e.g. the first collimating lens, may be configured to collimate light received at a first end/side of the optical collimator and to focus collimated light received at a second end/side of the optical collimator.

The deriving unit may comprise a converting component configured to convert received light into at least one voltage value. For example, the converting component may be configured to convert the received focused light into the at least one voltage value. The deriving unit may further comprise a monitoring component configured to determine the switching state of the high voltage disconnecting switch based on the at least one voltage value.

The monitoring component may be configured to determine an amount or degree of bending of the bendable optical component based on the at least one voltage. The monitoring component may be configured to determine the switching state of the high voltage disconnecting switch based on the amount or degree of bending of the bendable optical component.

The monitoring component may be configured to continuously or repetitively determine the switching state of the high voltage disconnecting switch. In this way, (online) monitoring and/or maintenance of the high voltage disconnecting switch can be provided.

The sensing device may further comprise a first adaptor. The first adaptor may be arranged on or mounted to a first side/end of the bendable optical component. For example, the first adaptor may be arranged between the optical collimator and the bendable optical component. The optical collimator may be mounted to a first side of the first adaptor. The bendable optical component may be mounted to a second side of the first adaptor.

The sensing device may further comprise a second adaptor. The second adaptor may be arranged on or mounted to a second side/end of the bendable optical component. For example, in the first embodiment described above, the second adaptor may be arranged between the focusing optics and the bendable optical component. The bendable optical component may be mounted to a first side of the second adaptor. The focusing optics may be mounted to a second side of the second adaptor.

The bendable optical component may be fixed on one end. The bendable optical component may be freely bendable on another end. For example, the bendable optical component may be fixedly attached to the first adaptor and movably attached to the second adaptor. In this way, the bendable optical component may be freely bendable or movable at the another end, e.g. within the second adaptor.

The bendable optical component may comprise or be configured as an optical tube. Alternatively, the bendable optical component may be a cylindrical optical fiber. The cylindrical optical fiber may have a tapered section. Alternatively, the bendable optical component may be a pair of optical fiber ends. The pair of optical fiber ends may be coupled on a flexible substrate.

According to a second aspect of the present invention, a high voltage disconnecting switch is proposed. The high voltage disconnecting switch comprises the sensing device as described herein.

The high voltage disconnecting switch may comprise a spring/switch spring and/or a switch arm configured to deform or change its shape when the switching state of the high voltage disconnecting switch changes. For example, the spring/switch spring or switch arm may be deformed or change its shape when the switching state of the high voltage disconnecting switch changes from an on state to an off state. The sensing device, e.g. the bendable optical component, may be directly or indirectly coupled or connected to the switch spring or switch arm such that a deformation or change of shape of the spring/switch spring or switch arm causes a bending of the bendable optical component. For example, in the on state, the switch arm elements may be connected to each other and, in an off state, the switch arm elements may be disconnected from each other. In the transition from the on state to the off state the switch arm elements may therefore change their position relative to each other, thereby causing the bendable optical component to bend depending on the change of the relative position. The elements of the switch arm may change their relative position by carrying out a rotation movement with respect to each other, for example.

The high voltage disconnecting switch may be configured as or comprise a breaking-closing disconnecting switch (BCDS), a centre break disconnecting switch, a double break disconnecting switch, a vertical break disconnecting switch, a panthograph disconnecting switch, a semi-panthograph disconnecting switch or a knee type disconnecting switch.

All details described herein with respect to the sensing device according to the first aspect can equally be applied to the high voltage disconnecting switch according to the second aspect and/or to a sensing method using the sensing device. So, even if some of the aspects described above have been described in reference to the sensing device and/or the high voltage disconnecting switch, these aspects may also apply to the method and vice versa.

It is clear to a person skilled in the art that the statements set forth herein may be implemented under use of hardware circuits, software means, or a combination thereof. The software means can be related to programmed microprocessors or a general computer, an ASIC (Application Specific Integrated Circuit) and/or DSPs (Digital Signal Processors). For example, the processing unit may be implemented at least partially as a computer, a logical circuit, an FPGA (Field Programmable Gate Array), a processor (for example, a microprocessor, microcontroller (μC) or an array processor)/a core/a CPU (Central Processing Unit), an FPU (Floating Point Unit), NPU (Numeric Processing Unit), an ALU (Arithmetic Logical Unit), a Coprocessor (further microprocessor for supporting a main processor (CPU)), a GPGPU (General Purpose Computation on Graphics Processing Unit), a multi-core processor (for parallel computing, such as simultaneously performing arithmetic operations on multiple main processor(s) and/or graphical processor(s)) or a DSP. For example, one or more of the aforementioned components may be implemented in the deriving unit, e.g. in the converting component and/or the monitoring component.

Although terms like "first" or "second" etc. may be used to describe different components or features, these components or features are not to be limited to these terms. With the above terms, only one component is to be distinguished from the other. For example, a first component may be referred to as a second component without departing from the scope of the present disclosure; and a second component may also be referred to as a first component.

In the present case, if a component is "connected to" or "coupled to" another component, this does not exclude that it is directly connected to or directly coupled to the other component, however, another component may be between the connected or coupled components. If, on the other hand, a component is "directly connected" to another component or "directly coupled" the other component, it is to be understood that no further components are present between the connected or coupled components.

In the following, the preferred embodiments of the present disclosure will be described with reference to the accompanying figures. In the figures, the same or corresponding components are always provided with the same reference signs. The dimensions and proportions of components or parts shown in the figures are not necessarily to scale; these dimensions and proportions may differ from illustrations in the figures and implemented embodiments.

Figure 2A:
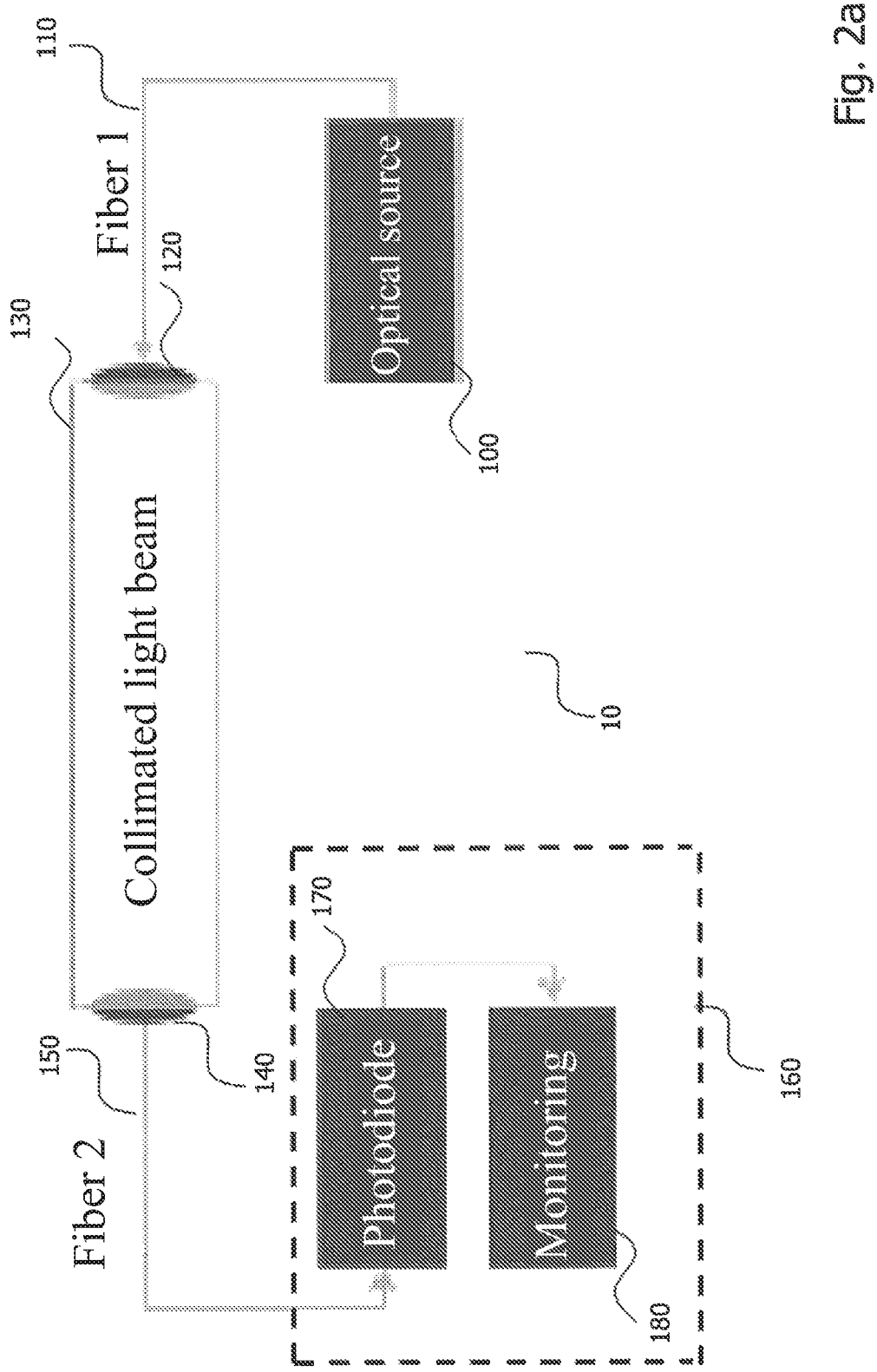
Figure 2C:
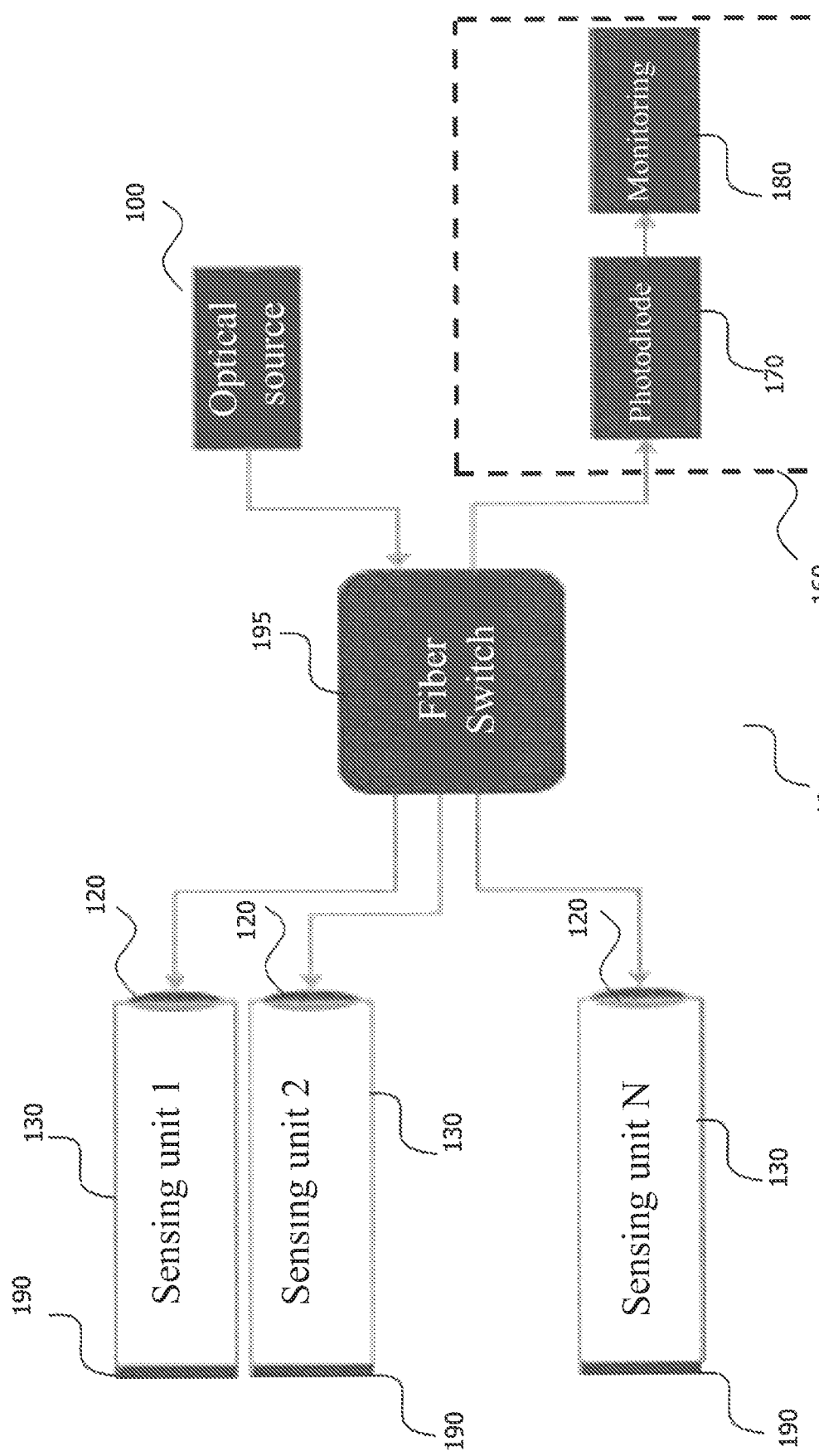
Figure 3A:
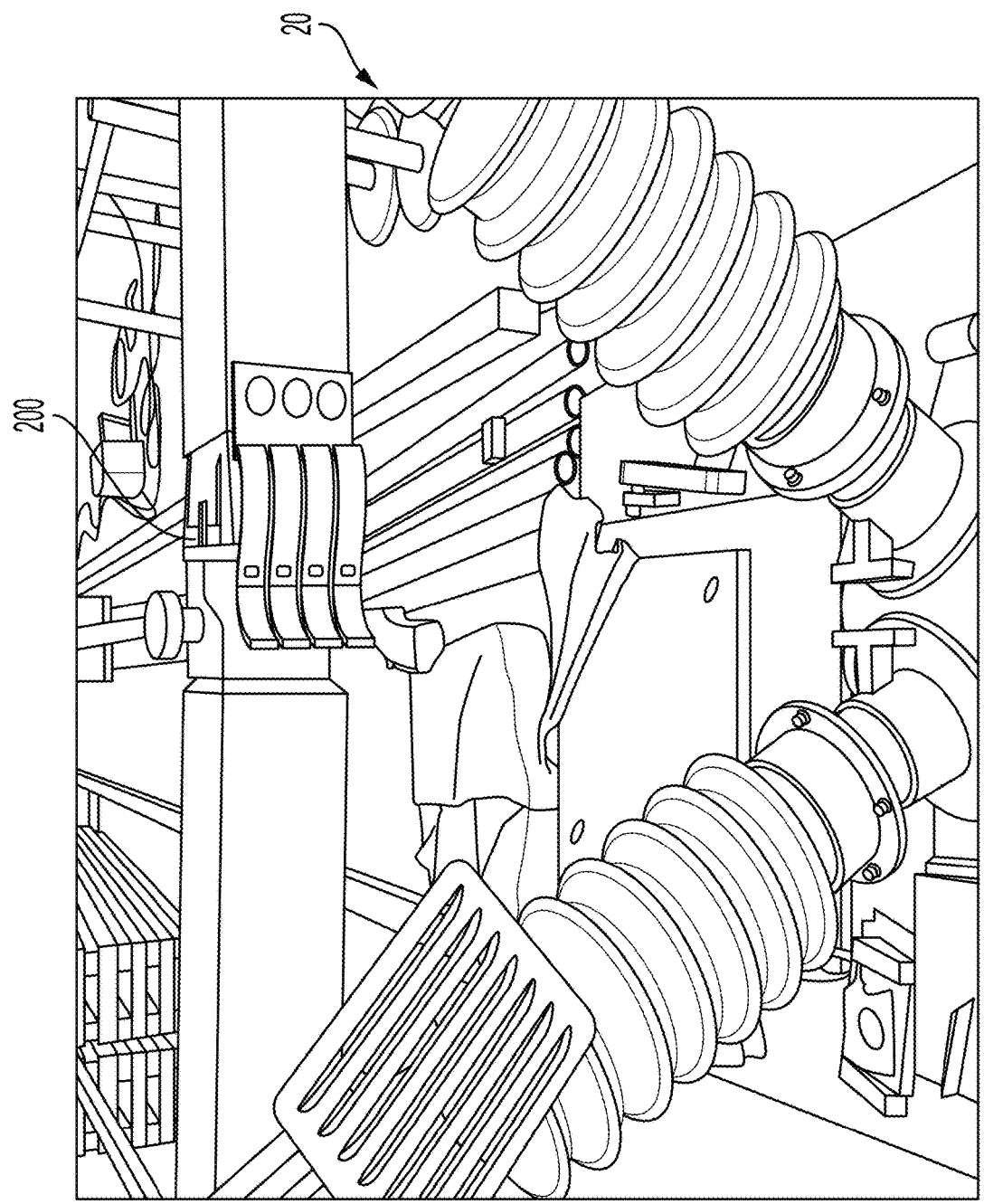
Figure 3B:
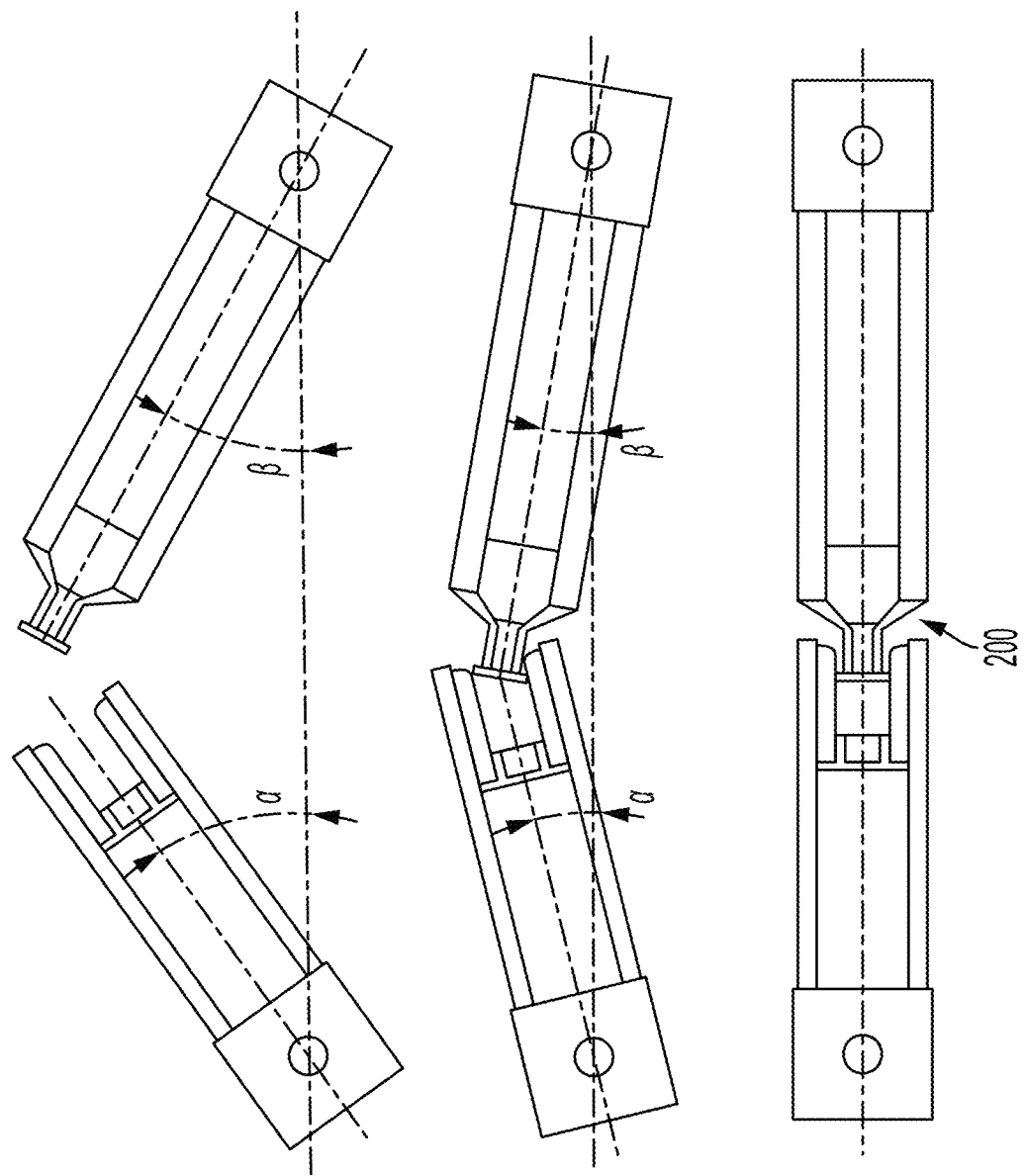
Figure 5:
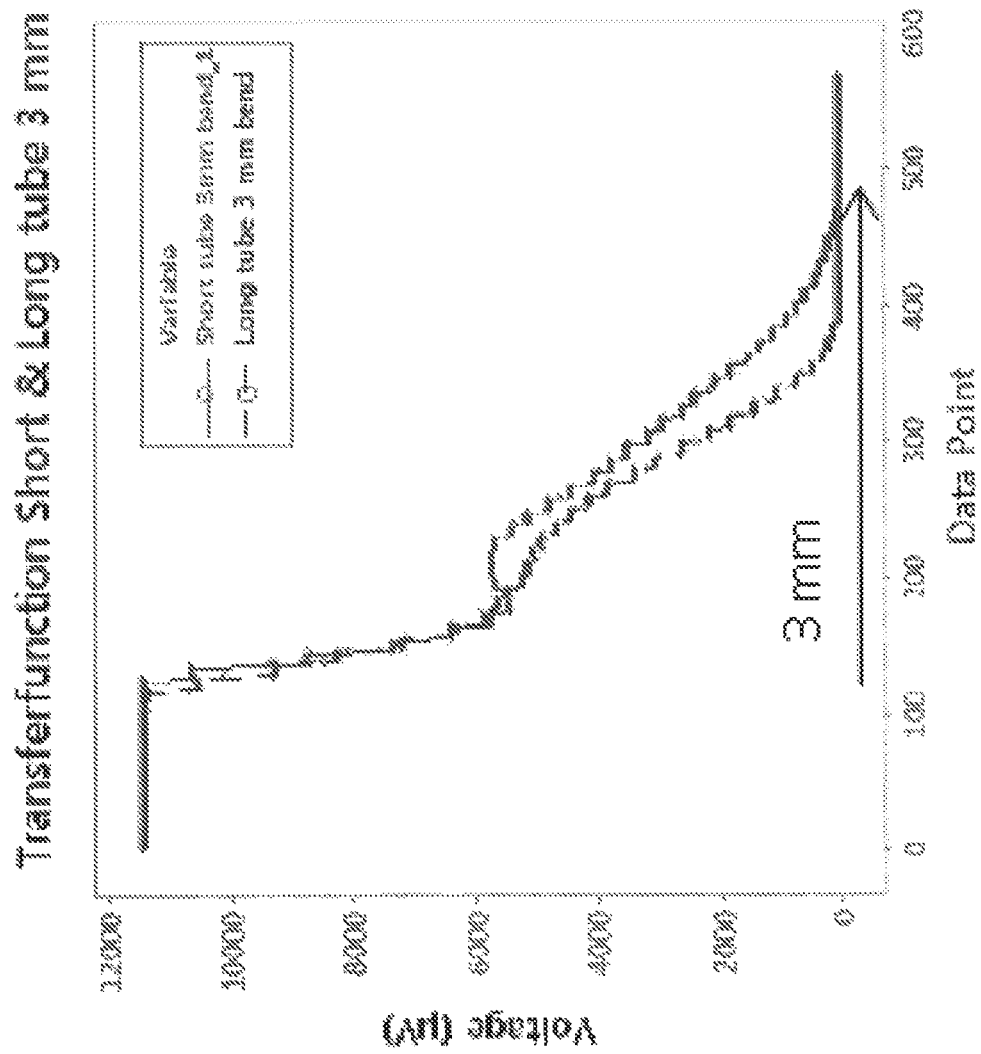
Figure 6:
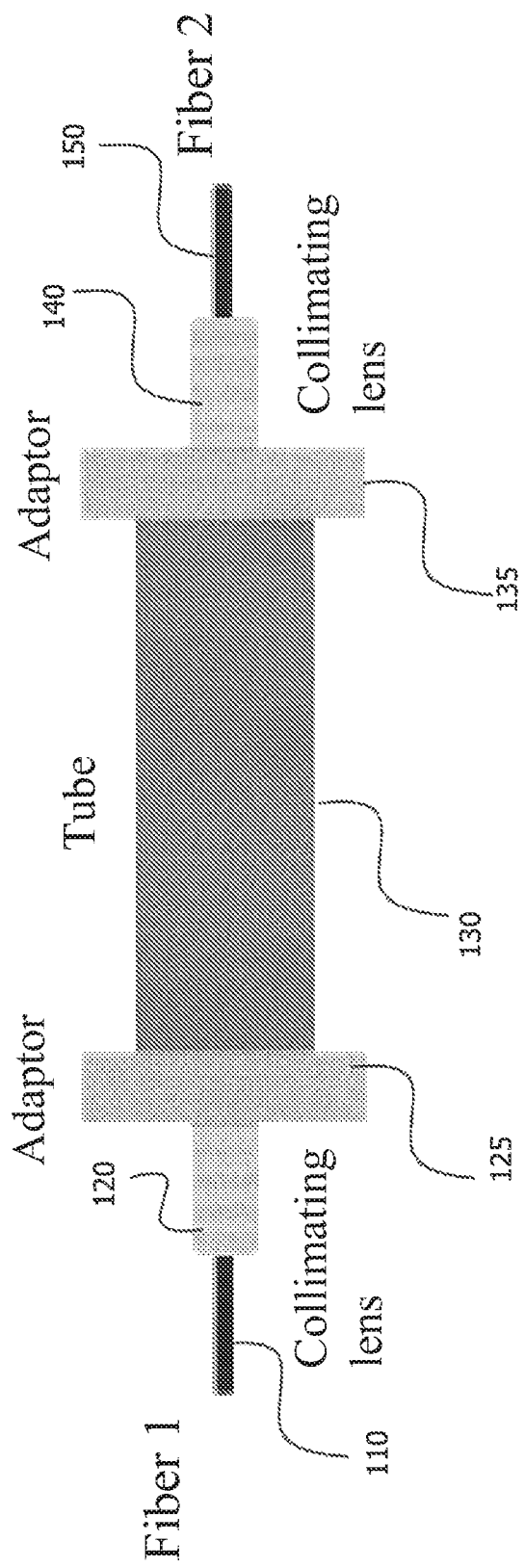
Figure 7:
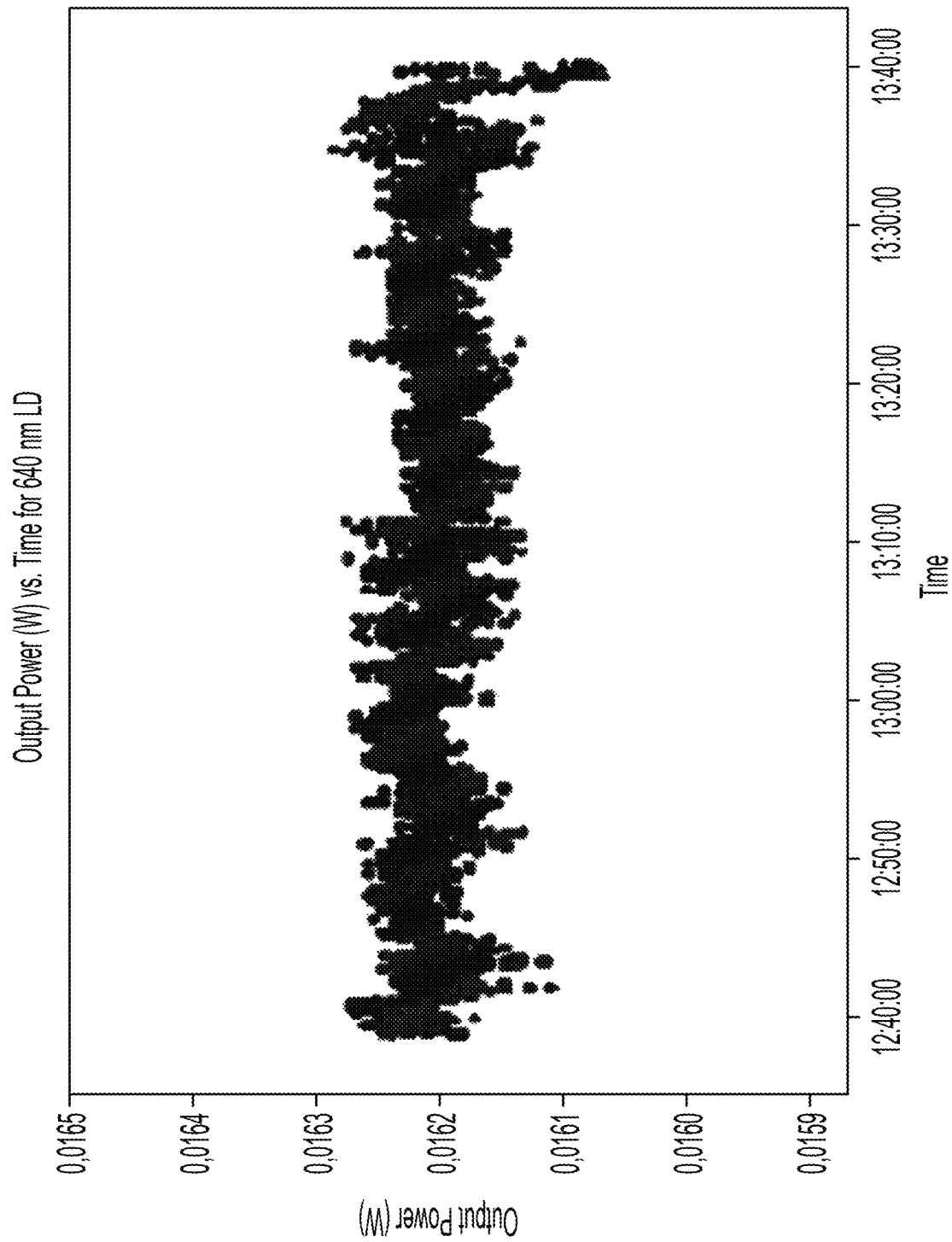
Figure 8:
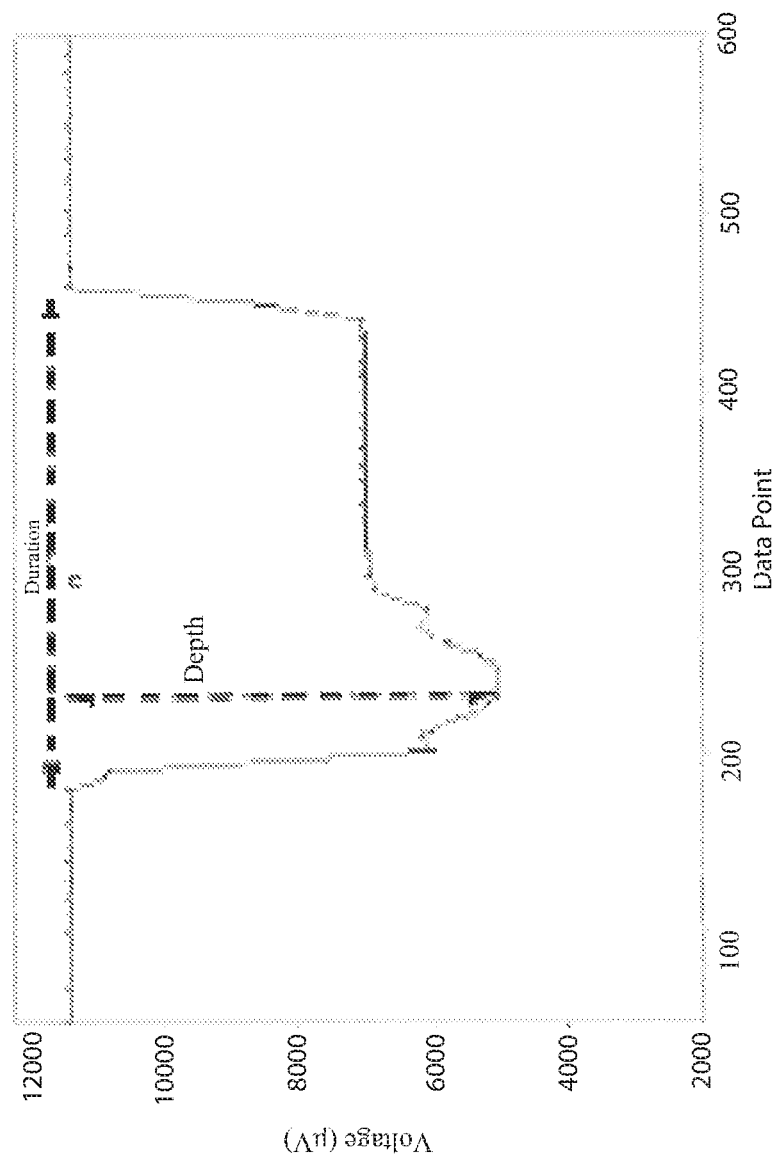
Figure 9A:
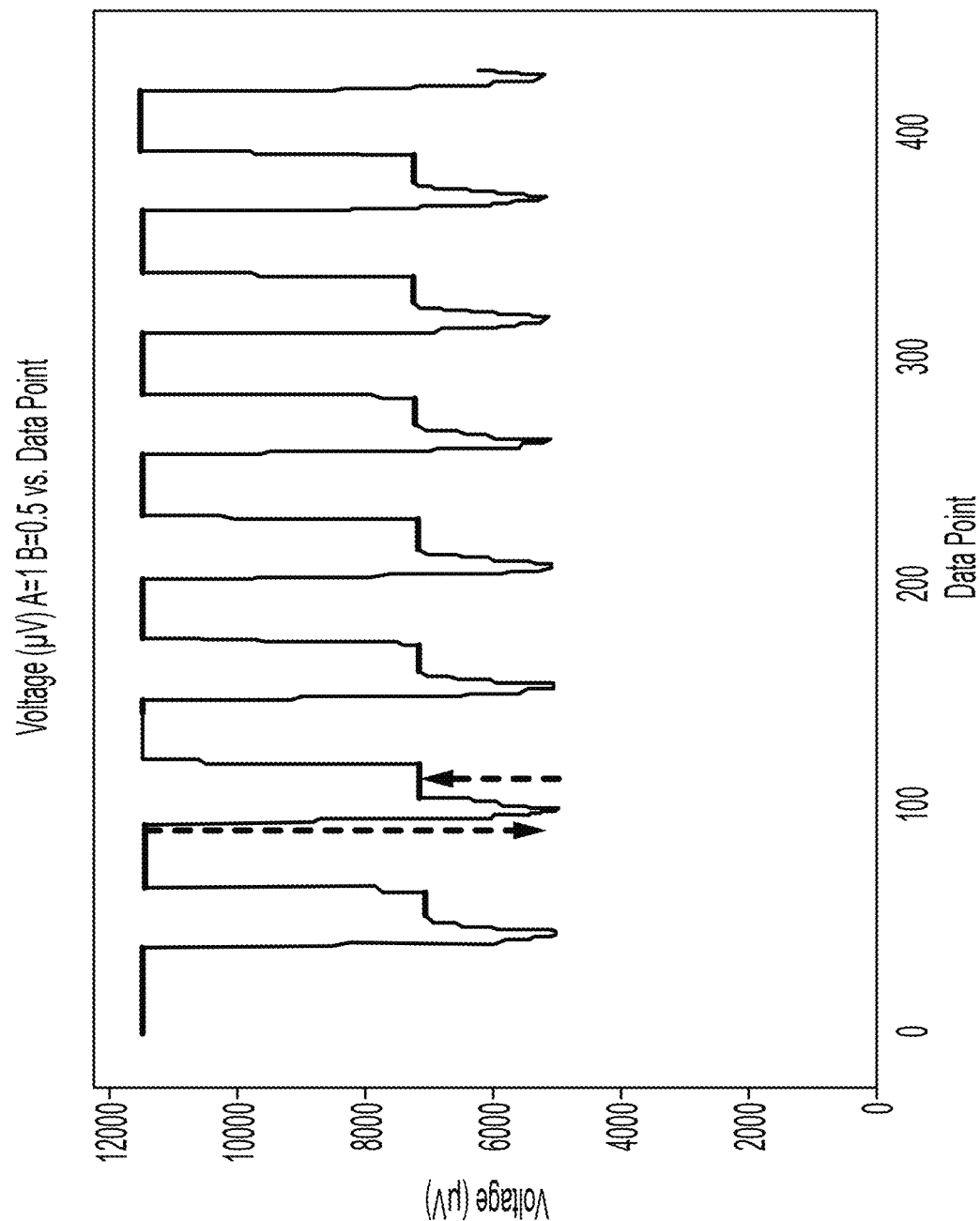
Figure 9B:
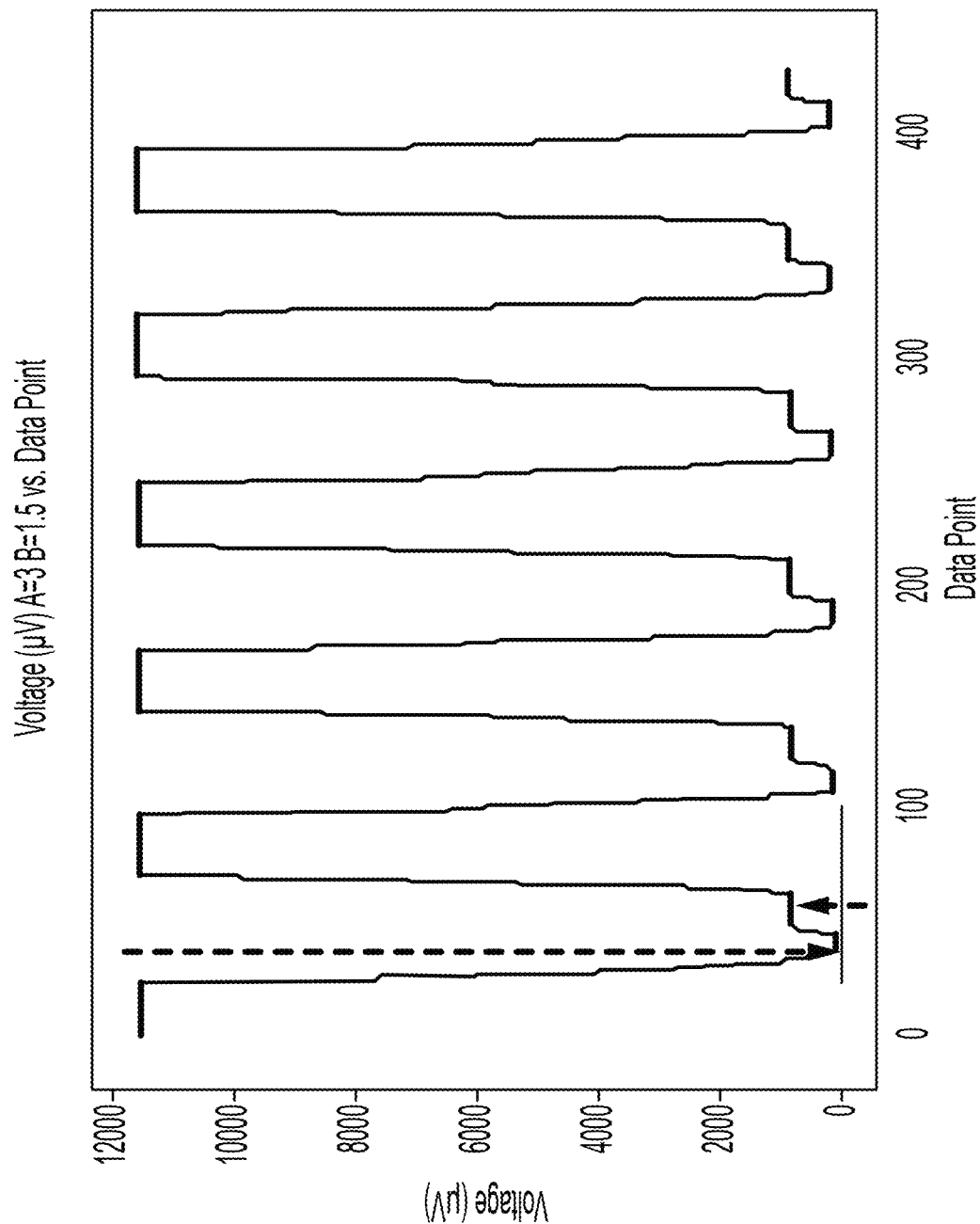
Figure 10A:
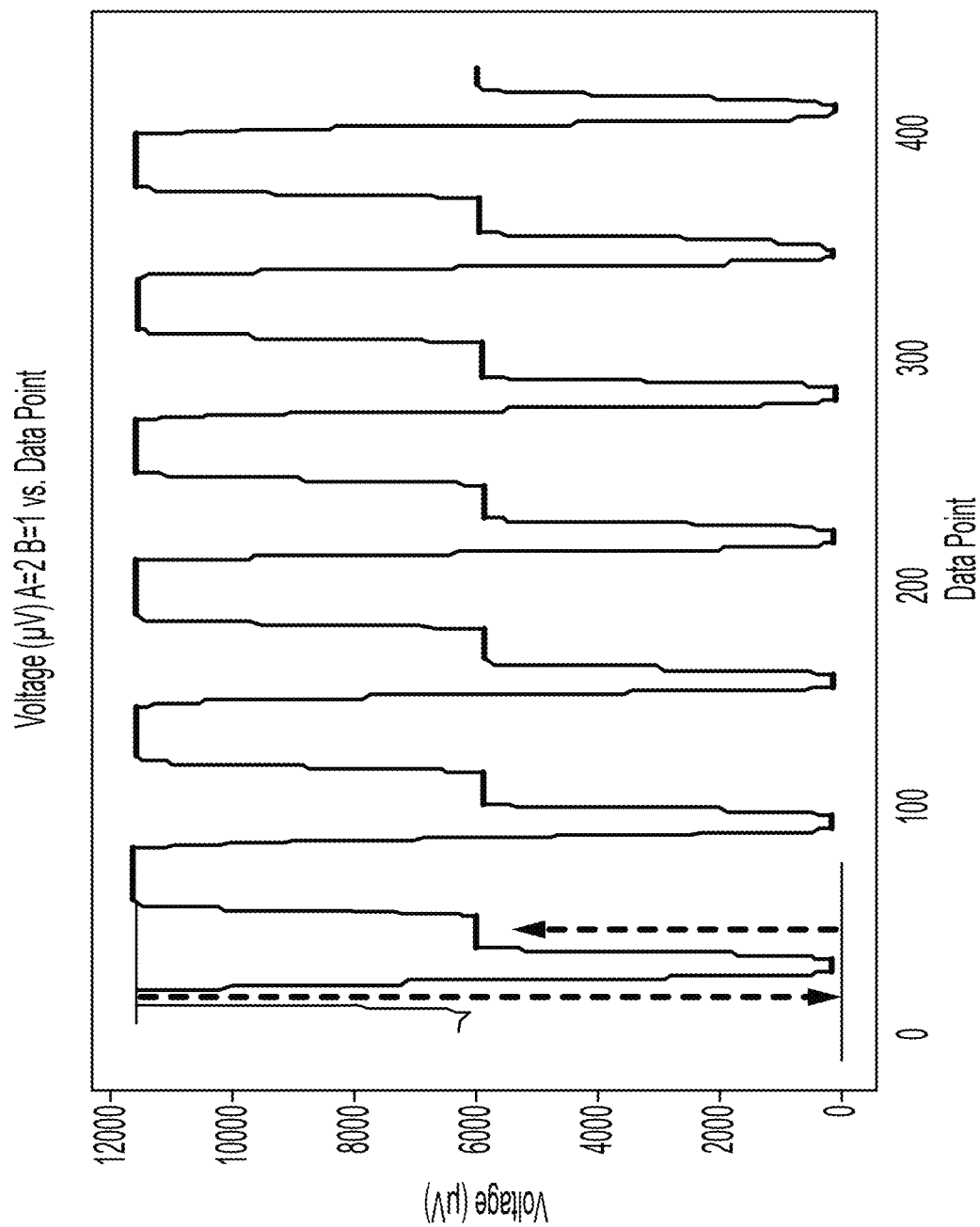
Figure 10B:
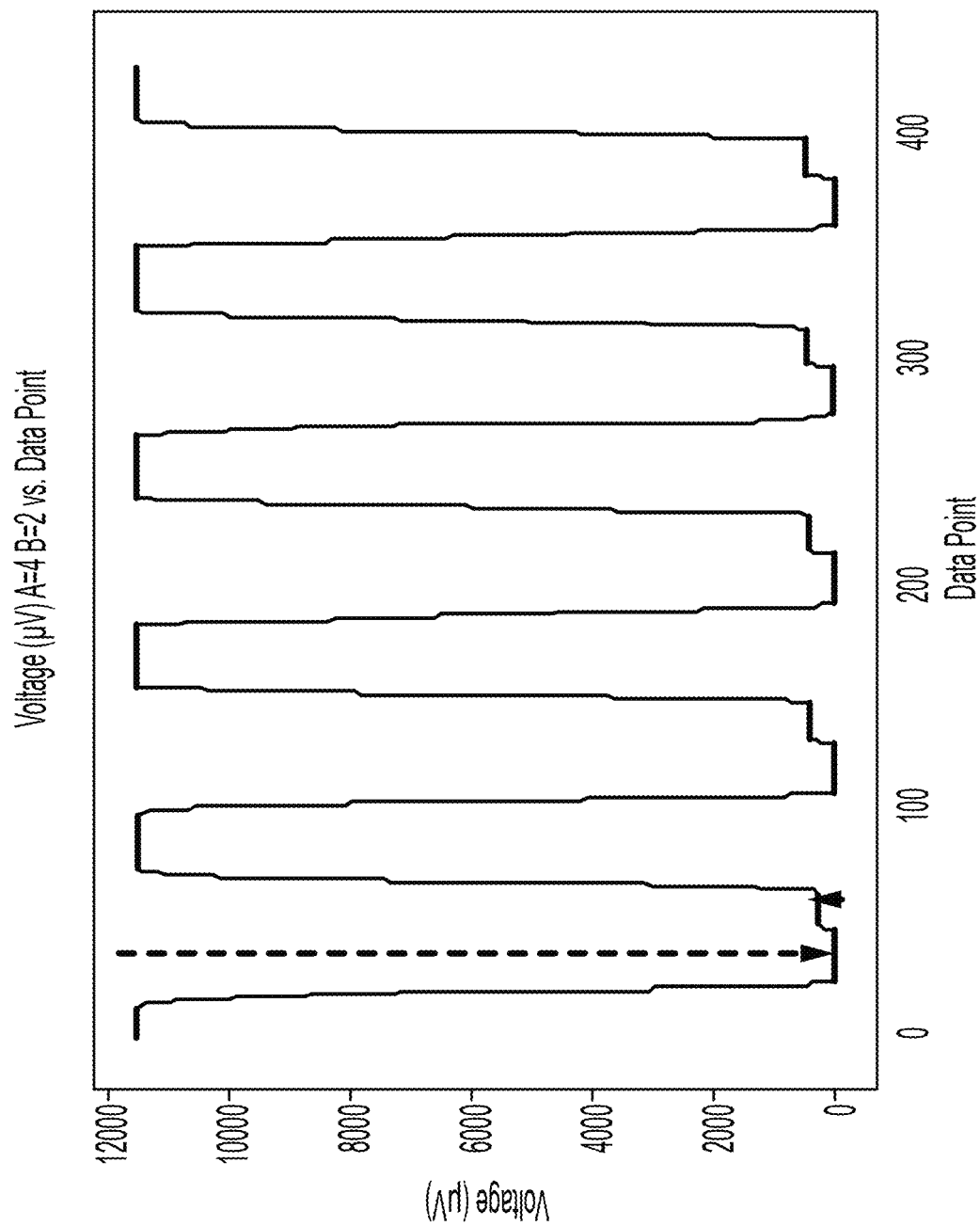
Figure 11:
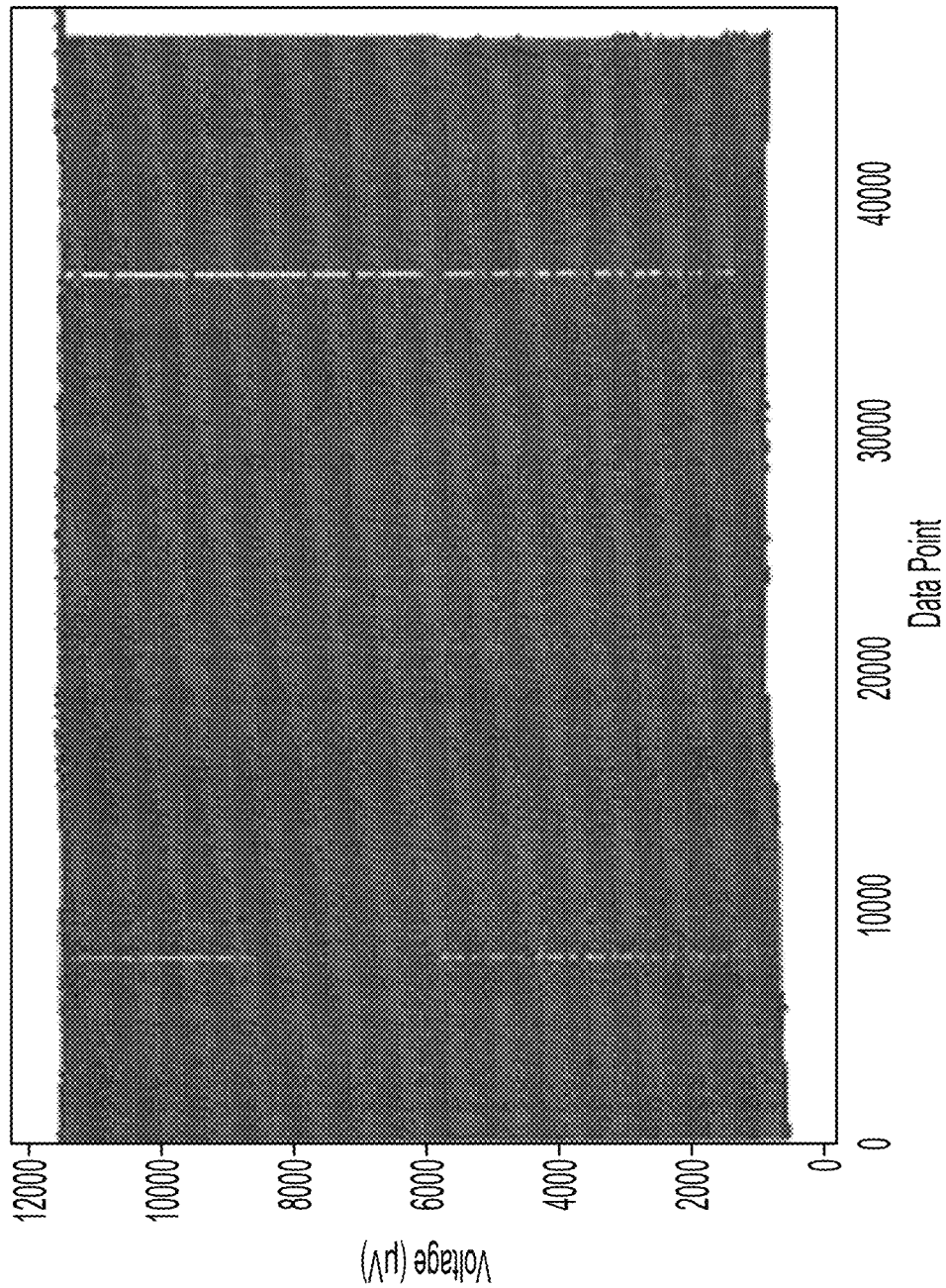

So, the above aspects and optional details of the invention will now be further described, by way of example only, with reference to the accompanying figures, wherein like reference numerals refer to like parts, and in which:

FIG. 1 schematically illustrates the change of a spring strain of a high voltage disconnecting switch versus time during "on" and "off" switching procedure;

FIG. 2a schematically illustrates a first embodiment of a sensing device for sensing the switching state of a high voltage disconnecting switch;

FIG. 2b schematically illustrates a second embodiment of a sensing device for sensing the switching state of a high voltage disconnecting switch;

FIG. 2c schematically illustrates a third embodiment of a sensing device for sensing the switching state of a high voltage disconnecting switch;

FIG. 3a schematically illustrate a conceivable realisation of a high voltage disconnecting switch including a switch arm;

FIG. 3b schematically illustrates a movement of the switch arm of FIG. 3a from off to on and vice versa;

FIG. 4a schematically illustrates a bending of a bendable tube of a sensing device;

FIG. 4b schematically illustrates a possible mounting of a sensing device on a switch arm;

FIG. 5 schematically illustrates a transfer function for bending the sensing device;

FIG. 6 schematically illustrates a detailed realization of elements of a sensing device;

FIG. 7 schematically illustrates a measures output power of a laser diode versus time;

FIG. 8 schematically illustrates switch arm movements simulated with a linear stage;

FIG. 9a schematically illustrates switch arm movements simulated with a linear stage with A=1 and B=0.5;

FIG. 9b schematically illustrates switch arm movements simulated with a linear stage with A=3 and B=1.5;

FIG. 10a schematically illustrates switch arm movements simulated with a linear stage with A=2 and B=1;

FIG. 10b schematically illustrates switch arm movements simulated with a linear stage with A=4 and B=2; and FIG. 11 schematically illustrates switch arm movements simulated with a linear stage with a test with 1000 simulated switch cycles for a tube length of 100 mm with A=2 mm and B=1 mm.

In the following description, for purposes of explanation and not limitation, specific details are set forth in order to provide a thorough understanding of the present disclosure. It will be apparent to one skilled in the art that the present disclosure may be practiced in other embodiments that depart from these specific details. Even if in the below the present disclosure is described sometimes or mainly with respect to a an BCDS, the disclosure may equally be practiced in or with other high voltage disconnecting switches.

Those skilled in the art will further appreciate that functions explained hereinbelow may be implemented using individual hardware circuitry, using software functioning in conjunction with a programmed microprocessor or a general purpose computer, using an application specific integrated circuit (ASIC) and/or using one or more digital signal processors (DSPs). It will also be appreciated that when the present disclosure is described as a method, it may also be embodied in a device (i.e., sensing device and the high voltage disconnecting switch described below), a computer processor and a memory coupled to a processor, wherein the memory is encoded with one or more programs that perform the methods disclosed herein when executed by the processor.

For high voltage disconnecting switches in general and BCDS devices in particular, there exist no established direct measurements of the "on" and "off" status of the switch or switch arm. FIG. 1 is depicting the change of a spring strain of the switch versus time during "on" (on state) and "off" (off state) switching procedures. In other words, FIG. 1 shows the strain in Newton during latching of a switch arm of a BCDS. For a typical center break disconnecting switch, the spring strain changes from 350 N to 0 N during switching from "on" to "off" (seconds 0 to 15). Reversing the procedure is shown between seconds 15 and 40. In this case, again the strain changes from 0 N to 350 N. Also, it can be seen in FIG. 1 that there is a certain tolerance off the strain from cycle to cycle of about 100 N. Considering FIG. 1, a direct measurement system is needed which is compatible with the high voltage environment. The strain imposed on such a spring was measured in figure on a BCDS without current to be in the range between 1 mm and 4 mm. The solution should resolve the process in the order of 40 seconds with a suitable number of data points covering the determined range of bending in mm.

The solution as described herein is solving the problem of online monitoring the "on" and "off" switching procedure of BCDS with a high temporal resolution in the range of >1 data point per second. The presented solution is designed for high voltage disconnecting switches and described particularly with respect to centre break disconnecting switches. In principle, it can also be tailored for double break, vertical break, panthograph, semi-panthograph and knee type disconnecting switches, for example. The sensing device described herein has a concrete optical and mechanical design involving fibers, lenses, mounts and is adapted to detect the movement, e.g. latching, of a switch arm during "on" and "off" switching procedures. The system is designed for a direct contact measurement and has therefore a low failure probability. As optics and electro-optics components can be separated spatially in the presented approach, the challenging environmental conditions (weather, electric and magnetic fields, high temperature of metal parts) can be tackled. By combining it with a fast readout and a specially matched intelligent algorithm, the presented solution represents a further step for digital business models. It will help solving problems of customers like downtimes of substations and will enable predictive maintenance.

Three possible embodiments of a sensing device (sensing unit) are shown in FIGS. 2a to 2c. In common to all embodiments is a sensing device 10 for a high voltage disconnecting switch. This embodiment is called common embodiment herein. The sensing device 10 comprises a first optical fiber 110, an optical collimator 120, a bendable optical component 130 and a deriving unit 160. The first optical fiber 110 is configured to receive light from an optical source 100. In the common embodiment, the first optical fiber 110 is connected, e.g. directly connected, to the optical source 100. The first optical fiber 110 is configured to guide the light received from the optical source 100. The optical collimator 120 is coupled, e.g. directly coupled, to the first optical fiber 110 to receive the light guided in the first optical fiber 110. The optical collimator 120 is configured to collimate the light into a collimated light beam. The bendable optical component 130 is coupled, e.g. directly coupled, to the optical collimator 120 to receive the collimated light beam. The bendable optical component 130 is configured to guide the collimated light beam. In other words, the collimated light beam propagates in the bendable optical component 130. The bendable optical component 130 is configured and arranged to bend depending on a switching state of the high voltage disconnecting switch. Thereby, the collimated light beam is influenced or optical properties of the bendable optical component 130 and/or the collimated light beam are changed. The deriving unit 160 is configured to derive information about the switching state of the high voltage disconnecting switch based on the collimated light beam. In other words, the deriving component 160 is configured to derive if the collimated light beam or optical properties of the collimated light beam changes and to thereby derive information about the switching state, e.g. whether the high voltage disconnecting switch is in an on state or an off state or is correctly performing switching procedures from the on state into the off state and/or from the off state into the on state.

In the following embodiments, the optical collimator 120 is, by way of explanation rather than limitation, configured as a collimating lens and will therefore be called collimating lens 120 in the following. In the following embodiments, the bendable optical component 130 is, by way of explanation rather than limitation, configured as a bendable optical tube and will therefore be called bendable optical tube 130 (or sometimes just tube 130) in the following. In the following embodiments, the deriving unit 160 comprises, by way of explanation rather than limitation, a photodiode 170 and a monitoring component 180.

Although the following details are described with respect to the bendable optical component 130 being configured as a bendable optical tube other configurations are possible. For example, the bendable optical component 130 can be configured as a cylindrical fiber. The cylindrical fiber may have a tapered section right at the point of interest. Further, the bendable optical component 130 may be configured as a pair of optical fiber ends. The pair of optical fiber ends 130 may be butt coupled on a flexible substrate without any optical components in between.

A first embodiment is shown in FIG. 2a. In this embodiment, the sensing device 10 is configured in a transmission arrangement. The sensing device 10 comprises a first optical fiber 110, a first collimating lens 120, a bendable optical tube (or, in short, tube) 130 in which the collimated light beam is guided, a second lens 140 for focusing the collimated light beam and a second optical fiber 150 in which the light (from the bendable optical tube 130) is in-coupled. The second lens 140 may be a collecting lens, a focusing lens and/or a collimating lens and may be called second collimating lens 140 in the following. The light focused by the second lens 120 is coupled into the second optical fiber 150 and guided to the deriving unit 160 comprising the photodiode 170 and the monitoring component 180.

A second embodiment is shown in FIG. 2b. In this embodiment, the sensing device 10 is configured in a reflection arrangement. The sensing device 10 comprises a first optical fiber 110, a first collimating lens 120, a bendable optical tube (or, in short, tube) 130 in which the collimated beam is guided, a mirror 190 for reflecting the collimated light beam and a focusing optics 120 for focusing the collimated beam. The focusing optics 120 is, by way of example, configured as the first collimating lens 120. The first collimating lens 120 is configured to collimate light entering from one side (right side in FIG. 2b) and is configured to focus collimated light entering from another side (left side in FIG. 2b). The light focused by the collimating lens 120 is coupled into the first optical fiber 110 and guided to the deriving unit 160 comprising the photodiode 170 and the monitoring component 180.

A third embodiment is shown in FIG. 2c. In this embodiment, the sensing device 10 is configured in a reflection arrangement with multiple sensing units or multiple bendable optical tubes 130. The sensing device 10 comprises a first optical fiber, a fiber switch 195, multiple first collimating lenses 120, multiple bendable optical tubes (or, in short, tubes) 130 in which the collimated beam is respectively guided, multiple mirrors 190 for respectively reflecting the collimated light beam and multiple focusing optics 120 for respectively focusing the collimated beam. The fiber switch 195 is configured to split up the light received from the optical source 100 into multiple light beams and to distribute the multiple light beams to multiple optical fibers. Likewise, the fiber switch 195 is configured to receive light beams from multiple optical fibers and to combine the multiple light beams into a single light beam to be guided by an optical fiber to the deriving unit 160. The focusing optics 120 are, by way of example, configured as first collimating lenses 120. The collimating lenses 120 are respectively configured to collimate light entering from one side (right side in FIG. 2c) and are respectively configured to focus collimated light entering from another side (left side in FIG. 2c). The light focused by the collimating lenses 120 is respectively coupled into another optical fiber, guided to the fiber switch 195 and from the fiber switch 195, through another optical fiber, to the deriving unit 160 comprising the photodiode 170 and the monitoring component unit 180.

The following generally applies to all embodiments mentioned above, i.e. the common embodiment, the first embodiment, the second embodiment and the third embodiment. One of the key ideas is to transduce the bending amplitude of a switch spring or a switch arm of a high voltage disconnecting switch to a change in optical properties of the bendable optical tube 130. The bending amplitude of the switch spring or switch arm may be between 1.5 mm and 4.5 mm. The change in optical properties may be an optical loss caused by bending the tube 130 in which the collimated (free) light beam is propagating.

An example of a high voltage disconnecting switch 20 is shown in FIG. 3a together with the switch spring or switch arm 200. The bending of the switch spring or switch arm 200 is shown in FIG. 3b. The bending of the switch spring or switch arm 200 is caused by changing the state of the switch spring or switch arm 200 from an off state (OFF) shown in the uppermost part of FIG. 3b to an on state (ON) shown in the lowermost part of FIG. 3b or by changing the state of the switch spring or switch arm 200 from the on state (ON) shown in the lowermost part of FIG. 3b to the off state (OFF) shown in the uppermost part of FIG. 3b.

The switch spring or switch arm 200 is directly or indirectly coupled or connected to/with the tube 130. Therefore, a bending of the switch spring or switch arm 200 causes a bending of the tube 130. The relaxed and bent tube 130 is shown schematically in FIG. 4a, wherein the upper part of FIG. 4a shows the relaxed (not bent) tube 130 and the lower part of FIG. 4a shows the bent tube 130. Arrows marked with A and B are indicating vectors of a sample movement of a tube end, e.g. the right end of the tube 130. The vectors A and B can have the following values: A=0 . . . 4 mm and B=0 . . . 4 mm. By way of example, the tube 130 is fixed on one end (left end) while the other end (right end) is freely bendable. So, FIG. 4a shows the bending of the tube 130 on one end (right), while a second end is fixed (left).

The sensing device 10 can be mounted to the high voltage disconnecting switch, more particularly to the switch spring or switch arm 200, such as the BCDS spring or BCDS arm, in various ways. One way for mounting the sensor on BCDS spring or arm 200 is shown in FIG. 4b. As can be seen in FIG. 4b, the bendable tube 130 is in contact with the spring or arm 200 so that it is bent when the spring or arm 200 is bent or changed from closed (off) to open state (on).

The measurement principle can be realized if the setup in any one of FIGS. 2a to 2c is used. Further, the used parts of the sensing device 10 may have the properties in the ranges given in Table 1 below. The embodiments shown in any one of FIGS. 2a to 2c was successfully realized experimentally with the properties in Table 1.

10 mm and 15 mm. While the x-axis is showing the number of consecutively measured data points, the y-axis is showing the voltage measured in μV with a photodiode 170. The movement comprises 60 times 50 μm linear translation steps resulting in a bending of up to 3 mm. A bending between 0 and 3 mm results in a clear drop of the measured voltage from 11430 μV to 21 μV. It can be seen that the exact slope in μV/mm can be tailored by varying the tube geometry. Also, it can be seen from FIG. 5, that the sensor 10 is able to resolve 50 μm bending. Thus, a high resolution of the

TABLE 1

Properties of used materials included in the sensor

| Component | Properties | Unit | Design value range |
|---|---|---|---|
| Tube material properties | Polypropylen (PP), Polyetheretherketon (PEEK), Polyphenylensulfid (PPS), Polyetherimide (PEI), Polysulfone (PSU), Polyethersulfon (PES), Polyphenylensulfon (PPSU), Polytetrafluorethylen (PTFE), Ethylen-Tetrafluorethylen (ETFE) | | |
| | Dielectric strength | kV/mm | 20 |
| | Hardness (tensile strength, compression strength) | MPa | 9-95 |
| | Modulus of elasticity | GPa | 0.1-39 |
| | Elongation at break | % | 40-110 |
| | Specific density | g/m$^3$ | 0.91-1.32 |
| | Glass temperature (upper limit) | °C. | 100, 260 |
| | Melting point | °C. | 60-400 |
| | Lower temperature limit | °C. | 5, −40 |
| | Coefficient of thermal expansion | ^m/m° C. | 2.7-414 |
| | Thermal conductivity | W/m/K | 0.03-11 |
| | Volume resistivity | Ohm*cm | 1 × 10A16-1 × 10A18 |
| | Surface resistivity | Ohm | 1 × 10A16 |
| | Dielectric constant at 1 MHz | — | 2.3-3.2 |
| | Arc resistance | sec | 88-180 |
| | Flammability | — | HB, V-0, 5VA |
| | Length | mm | 30-200 |
| Tube geometry | Wall thickness | mm | 0.5-10 |
| | Inner diameter | mm | 0.1-30 |
| | Outer diameter | mm | 1.1-50 |
| | Length | mm | 1-40 |
| Tube-collimator adaptor | Focal length | mm | 1-40 |
| | Diameter | mm | 1-30 |
| | Material (see tube material) | Same as tube material | Same as tube material |
| | Length | mm | 0.1-200 |
| Optical pathway between the fiber ends | Beam diameter | mm | 0.1-30 |
| | Core/clad material | | PMMA, fused silica with Fluorine doped cladding, fused silica with Germanium doped core |
| Optical properties of used fiber | core diameter | ^m | 9-2000 |
| | Clad diameter | ^m | 50-3000 |
| | numerical aperture | — | 0.06-0.58 |
| | coating material | | Acrylate, Polyimide, Silicone |
| | buffer material | | Polyamide, ETFE, PTFE |
| | Composition | | Same as tube material, any kind of Stainless steel, any kind of Aluminum, any kind of copper |
| Mechanical mount | Fixation | | Screws |
| | Inner diameter | | 1.1-50 plus tolerance |

FIG. 5 shows a transfer function for bending the sensor (sensing device) 10 between 0 and 3 mm. The transfer function shows how a linear movement of a length in mm is leading to the bending of the sensor 10, more particularly the tube 130, which transduces this bending to an optical loss measured on a photodiode 170 in μV. The measurement result is shown in FIG. 5 for two tubes 130 with a length of bending procedure (of the tube 130) and thus the switching procedure (of the high voltage disconnecting switch 10) is achieved.

FIG. 6 shows the optical setup and more particularly a possible detailed realization of the sensing transducer of the sensing device 10. The specific implementation of FIG. 6 is adapted to be used in the schematic setup of FIG. 2a but can be adapted to be used in the setups of FIGS. 2b and 2c as well (note: FIG. 6 is mirrored with respect to FIG. 2a, i.e. the left and right sides are interchanged). In FIG. 6, for the optical fibers 110, 150, an exemplary core diameter of 200 µm and a NA of 0.37 are employed for the first optical fiber 110 and the second optical fiber 150. Each fiber end is connectorized with SubMiniature version A (SMA) format by way of example. Collimators/collimating lenses 120, 140 with a focus length 6.25 mm and a NA of 0.37 are used to collimate the beam from the first optical fiber 110 for transmission in the tube 130 and to focus it again to the end facet of the second optical fiber 140. Adaptors 125, 135 are arranged between the tube 130 and the collimators 120, 140. These adaptors 125, 135 enable a fixed mounting by screwing the collimators 120, 140 in the adaptors 125, 135 on one side and the tube 130 to the adaptors 125, 135 on the other side. Even when both ends of the tube 130 are fixed other portions of the tube 130 can still bend or be bent. The optical transmission efficiency of the sensor 10 was 48% experimentally.

FIG. 7 shows the light source stability and, more particularly, the output power versus time of a laser light source, e.g. a laser diode, that can be used for the light source 100 of FIGS. 2a to 2c. The employed light source 100 is a laser diode with a wavelength of 640 nm and output power of 16.2 mW. To be able to resolve a repeat accuracy between simulated mechanical switch cycles, the emitted power was measured versus time. The result is shown in FIG. 7. From the measured data, a standard deviation of 0.028 mW was calculated. This equals a percentage of 0.17%. Using this light source, the best expected repeat accuracy between simulated switch cycles has a value of 0.17%. Thus, a stability is achieved.

FIG. 8 shows simulated switch arm 200 movements and, more particularly, switch movements, e.g. switch arm movements, simulated with a linear stage. FIGS. 9a and 9b show examples with A=1 and B=0.5 (FIG. 9a) and A=3 and B=1.5 (FIG. 9b) for a tube length of 100 mm. FIGS. 10a and 10b show switch movements simulated with a linear stage with A=2 and B=1 (FIG. 10a) and A=4 and B=2 (FIG. 10b) for a tube length of 150 mm.

By employing a linear stage, it is possible to realize the vectors A and B from FIG. 4a periodically. It has to be mentioned that, for a BCDS, the length of the vectors A and B verifiably are lying between 1 mm and 4 mm. Therefore, the values for A and B were chosen as (A=1; B=0.5) and (A=3; B=1.5) for a tube length of 100 mm and (A=2; B=1) and (A=4; B=2) for a tube length of 150 mm. This was done to take into account variation of the bending from switch cycle to cycle as well as tolerances between individual switch devices. The results are shown in FIGS. 9a and 9b for tube length 100 mm and in FIGS. 10a and 10b for tube length 150 mm.

The voltage change induced by the optical loss during the switching process has a typical signature for a well performing BCDS. This signature is recorded and depicted in FIGS. 9, 10a, 10b, 11a and 11b. The voltage change versus time can be logged employing a microcontroller which is connected to a data storage (local or cloud based). The microcontroller and/or the data storage may be implemented in the monitoring component 180. Alternatively, the microcontroller may be implemented in the monitoring component 180 and the data storage may be at least partially located in a component that is or can be in wireless and/or wired communication with the monitoring component 180. The variability of the characteristic parameters of the signature (FIG. 9) from cycle to cycle can be measured for an individual well performing switch 20 (e.g. depth, duration etc.). Also, the data can be used to classify if the switch 20 is in open or closed position, e.g. the switch spring or switch arm 200 is in open or closed position. The change of the characteristic signature parameters with scaling number of real switch cycles can be correlated in accelerated lifetime tests. This will enable predictions of the switch device health based on the data measured with the sensing system or sensing device 10.

Currently, only reactive and possibly preventive maintenance can be performed for BCDS devices. With the presented concept and solution, predictive maintenance can be performed. Especially the latching of the BCDS spring or arm 200, which has a duration of only a few seconds, can be resolved with a high accuracy. This is the only reported direct measurement method of the spring or arm movement. Therefore, using these data will enable the detection of disturbances of the latching procedure which could have an effect to the device lifetime. The data can be fed into models like the life time model, probabilistic failure and enlargement law. That is, the sensing device 10 is not only capable of determining the switching state in terms of the on (closed) or off (open) state of the switch 20. Rather, the sensing device 10 is also capable of monitoring the switching or latching procedure with high resolution and to thereby detect disturbances of the switching or latching procedure.

It can be seen from FIGS. 9a and 9b that the presented solution is capable of measuring a bending of the tube 130 at least between A=1 mm and A=3 mm if a tube length of 100 mm is used. It can also be seen from FIGS. 10a and 10b that a bending of the tube 130 of at least A=2 mm and A=4 mm can be measured by employing a tube length of 150 mm. The signal to noise ratios of the "on" position and the "off" position have values of 33.6 dB and 30.4 dB, correspondingly. Thus, the signal can clearly be distinguished from background noise of the photodiode 170 and the light source 100, e.g. laser source 100. To demonstrate the repeatability, a test was conducted with 1000 (in words, thousand) simulated switch cycles for a tube length of 100 mm and A=2 mm and B=1 mm. The result is shown in FIG. 11. That is, FIG. 11 shows a test with 1000 simulated switch cycles for a tube length of 100 mm with A=2 mm and B=1 mm. The result of the testing with 1000 cycles was that the measurement setup is environmentally stable over 5 hours. Also, the voltage at "off" position (start of vector A) has a very accurate value of 11430 µV+/−25 µV, while voltage in the "on" position (end of Vector B) was 5943 µV+/−85 µV. The extension of these results to A and B vectors between 0 . . . 4 mm is possible. The force, which is necessary for imposing the bending in the range 0 . . . 4 mm is in the range 0 to X N for the 100 mm and 0 to x N for the 150 mm tube 130.

By way of the present solution, an improved sensing device for high voltage disconnecting switches is provided. For example, a sensing device for high voltage disconnecting switches is provided that allows for accurate results and/or enables reliable monitoring of high voltage disconnecting switches. Still further, even predictive maintenance is enabled using the presented solution.

In energy systems, it is necessary to achieve grid stability for tackling future challenges like including renewable energy sources to the power grid despite their unplannable production patterns and supporting upcoming energy consumption peaks due to coupling of the electro mobility to the power grid. A digitization of substations by smart sensors is therefore inevitable. These sensor need to be compatible with the high electric and magnetic fields in substations. Fiber optical technologies as used in the sensing device 10 disclosed herein, enables operation of such sensors based on optical principles, while avoiding interference between electric and magnetic fields of the environment. Realizing the sensing itself with fiber optics brings the advantage that the measured signals can directly be transmitted in fiber optic networks to readout units which can be placed up to several kilometers away from the point of interest.

The invention claimed is:

1. A sensing device for a high voltage disconnecting switch, the sensing device comprising:
a first optical fiber configured to receive light from an optical source and configured to guide the light;
an optical collimator coupled to the first optical fiber to receive the light guided in the first optical fiber and configured to collimate the light into a collimated light beam;
a bendable optical component coupled to the optical collimator to receive the collimated light beam and configured to guide the collimated light beam,
wherein the bendable optical component is configured and arranged to bend depending on a switching state of the high voltage disconnecting switch, thereby influencing the collimated light beam; and
a deriving unit configured to derive information about the switching state of the high voltage disconnecting switch based on the collimated light beam.

2. The sensing device of claim 1, wherein the bending of the bendable optical component changes optical properties of the collimated light beam.

3. The sensing device of claim 1, wherein the optical collimator is coupled to a first end of the bendable optical component and the sensing device further comprises a focusing optics and a second optical fiber, wherein the focusing optics is coupled to a second end of the bendable optical component to receive the collimated light beam guided in the bendable optical component and is coupled to the second optical fiber, wherein
the focusing optics is configured to focus the collimated light beam into the second optical fiber,
the second optical fiber is configured to guide the focused light,
the deriving unit is coupled to the second optical fiber to receive the focused light, and
the deriving unit is configured to derive the information about the switching state of the high voltage disconnecting switch based on the received focused light.

4. The sensing device of claim 1, wherein the optical collimator is coupled to a first end of the bendable optical component and the sensing device further comprises a mirroring component and a focusing optics, wherein the mirroring component is coupled to a second end of the bendable optical component to reflect the collimated light beam back to the first end of the bendable optical component and the focusing optics is coupled to the first end of the bendable optical component to receive the reflected collimated light guided in the bendable optical component and is coupled to the first optical fiber, wherein
the focusing optics is configured to focus the reflected collimated light beam into the first optical fiber,
the first optical fiber is configured to guide the focused light,
the deriving unit is coupled to the first optical fiber to receive the focused light, and
the deriving unit is configured to derive the information about the switching state of the high voltage disconnecting switch based on the received focused light.

5. The sensing device of claim 1, wherein the deriving unit comprises a converting component configured to convert received light into at least one voltage value and a monitoring component configured to determine the switching state of the high voltage disconnecting switch based on the at least one voltage value.

6. The sensing device of claim 5, wherein the monitoring component is configured to determine a degree of bending of the bendable optical component based on the at least one voltage and to determine the switching state of the high voltage disconnecting switch based on the degree of bending of the bendable optical component.

7. The sensing device of claim 5, wherein the monitoring component is configured to continuously or repetitively determine the switching state of the high voltage disconnecting switch.

8. The sensing device of claim 1, wherein the sensing device further comprises a first adaptor arranged between the optical collimator and the bendable optical component, wherein the optical collimator is mounted to a first side of the first adaptor and the bendable optical component is mounted to a second side of the first adaptor.

9. The sensing device of claim 1, wherein the bendable optical component is fixed on one end and is freely bendable on another end.

10. The sensing device of claim 1, wherein the bendable optical component comprises or is configured as an optical tube, a cylindrical optical fiber having a tapered section or a pair of optical fiber ends coupled on a flexible substrate.

11. A high voltage disconnecting switch comprising the sensing device of claim 1.

12. The high voltage disconnecting switch of claim 11, wherein the high voltage disconnecting switch comprises a switch arm configured to deform when the switching state of the high voltage disconnecting switch changes, wherein the sensing device is coupled to the switch arm such that a deformation of the switch arm causes a bending of the bendable optical component.

13. The high voltage disconnecting switch of claim 11, wherein the high voltage disconnecting switch comprises or is configured as a breaking-closing disconnecting switch, BCDS, a centre break disconnecting switch, a double break disconnecting switch, a vertical break disconnecting switch, a pantograph disconnecting switch, a semi-pantograph disconnecting switch or a knee type disconnecting switch.

* * * * *